United States Patent
Nakamasu et al.

(10) Patent No.: US 10,284,034 B2
(45) Date of Patent: May 7, 2019

(54) ARMATURE, ROTATING ELECTRIC MACHINE, CROSSFLOW FAN

(71) Applicant: DAIKIN INDUSTRIES, LTD., Osaka-shi, Osaka (JP)

(72) Inventors: Shin Nakamasu, Osaka (JP); Hirokazu Fujii, Osaka (JP); Junichi Satou, Osaka (JP); Tatsuya Ogawa, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/743,989

(22) PCT Filed: May 9, 2016

(86) PCT No.: PCT/JP2016/063707
§ 371 (c)(1),
(2) Date: Jan. 11, 2018

(87) PCT Pub. No.: WO2017/010151
PCT Pub. Date: Jan. 19, 2017

(65) Prior Publication Data
US 2018/0233972 A1   Aug. 16, 2018

(30) Foreign Application Priority Data

Jul. 13, 2015 (JP) ................................. 2015-139552

(51) Int. Cl.
*H02K 1/26* (2006.01)
*H02K 3/18* (2006.01)
(Continued)

(52) U.S. Cl.
CPC .......... *H02K 1/265* (2013.01); *H02K 1/2786* (2013.01); *H02K 3/12* (2013.01); *H02K 3/18* (2013.01);
(Continued)

(58) Field of Classification Search
CPC ............ H02K 1/22; H02K 1/27; H02K 1/276; H02K 1/2786; H02K 21/12; H02K 21/14;
(Continued)

(56) References Cited

U.S. PATENT DOCUMENTS 5,804,904 A * 9/1998 Park ........................ H02K 29/03
310/179
6,081,059 A * 6/2000 Hsu ........................ H02K 1/148
29/596

(Continued)

FOREIGN PATENT DOCUMENTS

EP  1 344 296 B1   7/2008
JP  60-029319 Y2   9/1985
(Continued)

OTHER PUBLICATIONS

International Search Report for PCT/JP2016/063707 (PCT/ISA/210) dated Aug. 9, 2016.

*Primary Examiner* — Tran N Nguyen
(74) *Attorney, Agent, or Firm* — Birch, Stewart, Kolasch & Birch, LLP

(57) ABSTRACT

A U-phase winding includes four winding portions connected in series between a neutral point and a U-phase input end. A V-phase winding includes four winding portions connected in series between the neutral point and a V-phase input end. A W-phase winding includes four winding portions connected in series between the neutral point and a W-phase input end. These winding portions are arranged annularly around a predetermined location. Directions in which these winding portions are each wound from a first winding end to a second winding end are the same as viewed from the predetermined location.

9 Claims, 10 Drawing Sheets

(51) Int. Cl.
*H02K 1/27* (2006.01)
*H02K 3/12* (2006.01)
*H02K 3/28* (2006.01)
*H02K 3/52* (2006.01)
*H02K 15/04* (2006.01)
*H02K 21/44* (2006.01)

(52) U.S. Cl.
CPC ............... *H02K 3/28* (2013.01); *H02K 3/52* (2013.01); *H02K 15/0435* (2013.01); *H02K 21/44* (2013.01); *H02K 2203/03* (2013.01)

(58) Field of Classification Search
CPC .. H02K 3/00; H02K 3/18; H02K 3/26; H02K 3/28; H02K 3/52
See application file for complete search history.

(56) References Cited

U.S. PATENT DOCUMENTS

| | | | |
|---|---|---|---|
| 7,821,165 B2 | 10/2010 | Yamane et al. | |
| 8,519,592 B2* | 8/2013 | Nishiyama | H02K 3/28 310/180 |
| 9,601,956 B2 | 3/2017 | Miyashita et al. | |
| 2004/0041486 A1 | 3/2004 | Gary | |
| 2004/0041489 A1 | 3/2004 | Horst et al. | |
| 2005/0174008 A1* | 8/2005 | Tsai | H02K 29/03 310/216.112 |
| 2007/0252447 A1* | 11/2007 | Ionel | H02K 1/148 310/44 |
| 2009/0115271 A1* | 5/2009 | Takahashi | H02K 3/522 310/71 |
| 2010/0102656 A1* | 4/2010 | Booth | H02K 9/08 310/64 |
| 2010/0253272 A1* | 10/2010 | Stiesdal | H02K 1/12 318/540 |
| 2013/0170951 A1* | 7/2013 | Sato | H02P 6/06 415/1 |
| 2017/0155296 A1 | 6/2017 | Nakamasu et al. | |

FOREIGN PATENT DOCUMENTS

| | | | | |
|---|---|---|---|---|
| JP | 2000217290 A | * | 8/2000 | ............... H02K 3/28 |
| JP | 2001-204147 A | | 7/2001 | |
| JP | 2002-199638 A | | 7/2002 | |
| JP | 2005-020851 A | | 1/2005 | |
| JP | 2010-193675 A | | 9/2010 | |
| JP | 4670868 B2 | | 4/2011 | |
| JP | 2014-073047 A | | 4/2014 | |
| WO | WO 2004/021544 A2 | | 3/2004 | |
| WO | WO 2007/052385 A1 | | 5/2007 | |
| WO | WO 2013/080720 A1 | | 6/2013 | |
| WO | WO 2016/002690 A1 | | 1/2016 | |

* cited by examiner

ARMATURE, ROTATING ELECTRIC MACHINE, CROSSFLOW FAN

TECHNICAL FIELD

The present invention relates to an armature including 12n teeth (n is a positive integer) arranged in a circumferential direction and an armature winding concentratedly wound around each of these teeth, and particularly to an armature composing a rotating electric machine with a field element having $(12\pm2)n$ poles.

BACKGROUND ART

Motors often have problems with exciting forces in their rotating direction (hereinafter provisionally referred to as "rotating exciting forces"). The rotating exciting forces are broadly divided into cogging torque with no current applied, and torque ripple with a current applied.

It is known that when N denotes the number of slots and P denotes the number of poles (N and P are positive integers), the order of harmonics of cogging torque is the lowest common multiple of N and P.

For example, a motor with 8 poles and 12 slots and a motor with 10 poles and 12 slots are compared in terms of the order. The lowest common multiple of 8 and 12 of the former is 24, whereas the lowest common multiple of 10 and 12 of the latter is 60. Since the order of the cogging torque per turn of the rotor of the motor is larger in the latter, the peak value of the cogging torque is reduced in the latter.

As such, motors with $(12\pm2)n$ poles and 12n teeth (hereinafter provisionally referred to as "12-slot series motors") are recognized as promising motors with little vibration and noise. Particularly, fields where smooth torque transfer is necessary (e.g., EPS for vehicles and fan drive motors) require lower rotating exciting forces, and thus the 12-slot series motors are used in these fields.

However, since the winding directions and connection of concentratedly-wound armatures in the 12-slot series motors are more complicated than those of the motors with 8 poles and 12 slots, a problem with deteriorating industrial productivity is known.

In order to address this problem, in Japanese Patent Application Laid-Open No. 2010-193675 indicated below, two connection nozzles are provided per phase, by which respective armature windings are wound parallel in opposite directions. Accordingly, the armature windings can be wound with the connection nozzles operated in the same direction, thus indicating that Japanese Patent Application Laid-Open No. 2010-193675 discloses a technique for increasing the productivity.

SUMMARY OF INVENTION

Problem to be Solved by Invention

However, in Japanese Patent Application Laid-Open No. 2010-193675, armature windings are wound in a complicated manner, such as:

(i) when the armature windings wound around a pair of teeth that are adjacent in a circumferential direction are in the same phase, the winding directions are opposite to each other as viewed from the center of the armature;

(ii) when the armature windings wound around the pair of teeth that are adjacent in the circumferential direction are in different phases, the winding directions are the same as viewed from the center of the armature; and (iii) when the armature windings wound around a pair of teeth that are directly opposite to each other (i.e., displaced 180 degrees in the circumferential direction), the winding directions are opposite to each other as viewed from the center of the armature.

Furthermore, it is necessary to wind an armature winding around each of the teeth in a unified shape. Thus, winding the armature windings in the same phase in parallel with each other around the teeth that are adjacent in the circumferential direction reduces a space factor of the armature windings. To avoid such reduction, winding the armature windings at time intervals reduces the productivity.

Japanese Patent Application Laid-Open No. 2014-73047 discloses a technique for winding armature windings around respective divided cores in the same direction. Furthermore, Japanese Patent Application Laid-Open No. 2014-73047 discloses a technique for eliminating a crossover line by mutually connecting the windings for teeth on a multilayer wiring board, whereby the problem of Japanese Patent Application Laid-Open No. 2010-193675 is solved.

However, the number of wiring layers necessary for the multilayer wiring board is four. Although Japanese Patent Application Laid-Open No. 2014-73047 indeed explains that the number of wiring layers has been reduced, the multilayer wiring board is still expensive if the number of the layers is four.

Furthermore, although four armature windings are provided per phase in both Japanese Patent Application Laid-Open No. 2010-193675 and Japanese Patent Application Laid-Open No. 2014-73047, two current paths are connected in parallel in the phase. Thus, these two current paths sometimes differ in induced voltage. Since a ring current flows in this case, a Joule loss occurs. Furthermore, there are problems, through reduction in the induced voltage in the entirety of the phase, with deterioration in the torque characteristics and the loss characteristics of the motor.

Japanese Patent No. 4670868 describes a similar technique, and has problems similar to those of Japanese Patent Application Laid-Open No. 2014-73047.

The present invention has been conceived in view of the above problems, and provides techniques for connecting armature windings per phase in series and winding the armature windings around respective teeth in the same direction to easily manufacture an armature.

Means to Solve the Problem

An armature (1) according to the present invention includes, as a three-phase winding, a first-phase winding, a second-phase winding, and a third-phase winding star-connected to a neutral point (N). The first-phase winding includes first to fourth first-phase winding portions (Lu1, Lu2, Lu3, Lu4) connected in series between the neutral point and a first-phase input end (Pu), the second-phase winding includes first to fourth second-phase winding portions (Lv1, Lv2, Lv3, Lv4) connected in series between the neutral point and a second-phase input end (Pv), and the third-phase winding includes first to fourth third-phase winding portions (Lw1, Lw2, Lw3, Lw4) connected in series between the neutral point and a third-phase input end (Pw). Preferably, the armature (1) composes a rotating electric machine of an outer rotor type with a field element (2) having $(12\pm2)n$ poles, n being a positive integer.

In the first aspect, the first to fourth first-phase winding portions, the first to fourth second-phase winding portions, and the first to fourth third-phase winding portions are arranged annularly around a predetermined location. In addition, directions in which the first to fourth first-phase winding portions, the first to fourth second-phase winding portions, and the first to fourth third-phase winding portions are each wound from the first winding end to the second winding end are the same as viewed from the predetermined location.

Preferably, the first winding end (s) of the first first-phase winding portion (Lu1) and the first winding end (s) of the second first-phase winding portion (Lu2) are connected to each other, the second winding end (e) of the first first-phase winding portion (Lu1) and the first-phase input end (Pu) are connected to each other, the second winding end (e) of the second first-phase winding portion (Lu2) and the first winding end (s) of the third first-phase winding portion (Lu3) are connected to each other, the first winding end (s) of the fourth first-phase winding portion (Lu4) and the neutral point are connected to each other, the second winding end (e) of the fourth first-phase winding portion (Lu4) and the second winding end (e) of the third first-phase winding portion (Lu3) are connected to each other, the first winding end (s) of the third second-phase winding portion (Lv3) and the first winding end (s) of the fourth second-phase winding portion (Lv4) are connected to each other, the second winding end (e) of the fourth second-phase winding portion (Lv4) and the neutral point are connected to each other, the second winding end (e) of the third second-phase winding portion (Lv3) and the first winding end (s) of the second second-phase winding portion (Lv2) are connected to each other, the first winding end (s) of the first second-phase winding portion (Lv1) and the second-phase input end (Pv) are connected to each other, the second winding end (e) of the first second-phase winding portion (Lv1) and the second winding end (e) of the second second-phase winding portion (Lv2) are connected to each other, the first winding end (s) of the third third-phase winding portion (Lw3) and the first winding end (s) of the fourth third-phase winding portion (Lw4) are connected to each other, the second winding end (e) of the fourth third-phase winding portion (Lw4) and the neutral point are connected to each other, the second winding end (e) of the third third-phase winding portion (Lw3) and the first winding end (s) of the second third-phase winding portion (Lw2) are connected to each other, the first winding end (s) of the first third-phase winding portion (Lw1) and the third-phase input end (Pw) are connected to each other, and the second winding end (e) of the first third-phase winding portion (Lw1) and the second winding end (e) of the second third-phase winding portion (Lw2) are connected to each other.

More preferably, the first second-phase winding portion (Lv1), the second second-phase winding portion (Lv2), the first first-phase winding portion (Lu1), the second first-phase winding portion (Lu2), the first third-phase winding portion (Lw1), the second third-phase winding portion (Lw2), the third second-phase winding portion (Lv3), the fourth second-phase winding portion (Lv4), the third first-phase winding portion (Lu3), the fourth first-phase winding portion (Lu4), the third third-phase winding portion (Lw3), and the fourth third-phase winding portion (Lw4) are arranged annularly around the predetermined location in this order.

The second aspect of the armature according to the present invention is the first aspect, in which the second winding end (e) of the first second-phase winding portion (Lv1), the first winding end (s) of the first second-phase winding portion (Lv1), the second winding end (e) of the second second-phase winding portion (Lv2), the first winding end (s) of the second second-phase winding portion (Lv2), the second winding end (e) of the first first-phase winding portion (Lu1), the first winding end (s) of the first first-phase winding portion (Lu1), the second winding end (e) of the second first-phase winding portion (Lu2), the first winding end (s) of the second first-phase winding portion (Lu2), the second winding end (e) of the first third-phase winding portion (Lw1), the first winding end (s) of the first third-phase winding portion (Lw1), the second winding end (e) of the second third-phase winding portion (Lw2), the first winding end (s) of the second third-phase winding portion (Lw2), the second winding end (e) of the third second-phase winding portion (Lv3), the first winding end (s) of the third second-phase winding portion (Lv3), the second winding end (e) of the fourth second-phase winding portion (Lv4), the first winding end (s) of the fourth second-phase winding portion (Lv4), the second winding end (e) of the third first-phase winding portion (Lu3), the first winding end (s) of the third first-phase winding portion (Lu3), the second winding end (e) of the fourth first-phase winding portion (Lu4), the first winding end (s) of the fourth first-phase winding portion (Lu4), the second winding end (e) of the third third-phase winding portion (Lw3), the first winding end (s) of the third third-phase winding portion (Lw3), the second winding end (e) of the fourth third-phase winding portion (Lw4), and the first winding end (s) of the fourth third-phase winding portion (Lw4) are arranged annularly around the predetermined location in this order.

A rotating electric machine according to the present invention includes: the armature (1) according to the second aspect; and a field element (2) having (12±2)n poles. Preferably, the field element (2) includes magnets (21) surrounding the armature (1), so that the rotating electric machine is of an outer rotor type. More preferably, the magnets (21) are resin magnets.

A cross-flow fan according to the present invention is to be driven by the rotating electric machine.

Effects of Invention

According to the first aspect of the armature according to the present invention, a rotating electric field suitable for the field element having (12±2)n poles can be generated by supplying a three-phase AC voltage to the first-phase input end, the second-phase input end, and the third-phase input end. In addition, directions in which the first to fourth first-phase winding portions, the first to fourth second-phase winding portions, and the first to fourth third-phase winding portions are each wound from the first winding end to the second winding end are the same, leading to simplification of the process of manufacturing these winding portions (these winding portions are easily manufactured).

According to the second aspect of the armature according to the present invention, the two wiring layers suffice as wiring layers necessary for connection among the first to fourth first-phase winding portions, the first to fourth second-phase winding portions, and the first to fourth third-phase winding portions.

When the rotating electric machine according to the present invention is particularly of the outer rotor type, a printed circuit board can be miniaturized.

When the rotating electric machine according to the present invention is of the outer rotor type and drives the cross-flow fan, the area of the magnets can be designed to be larger.

The rotating electric machine of the outer rotor type is easily multipolarized.

Furthermore, use of the resin magnets as the magnets allows field elements having different number of poles to be easily obtained.

The objects, features, aspects, and advantages of the present invention will become more apparent from the following detailed description and the accompanying drawings.

DESCRIPTION OF EMBODIMENTS

A motor as an example of a 12-slot series motor where n=1, that is, a motor with 10 or 14 poles and 12 teeth will be described hereinafter. The following description holds even for n≥2.

Figure 1:
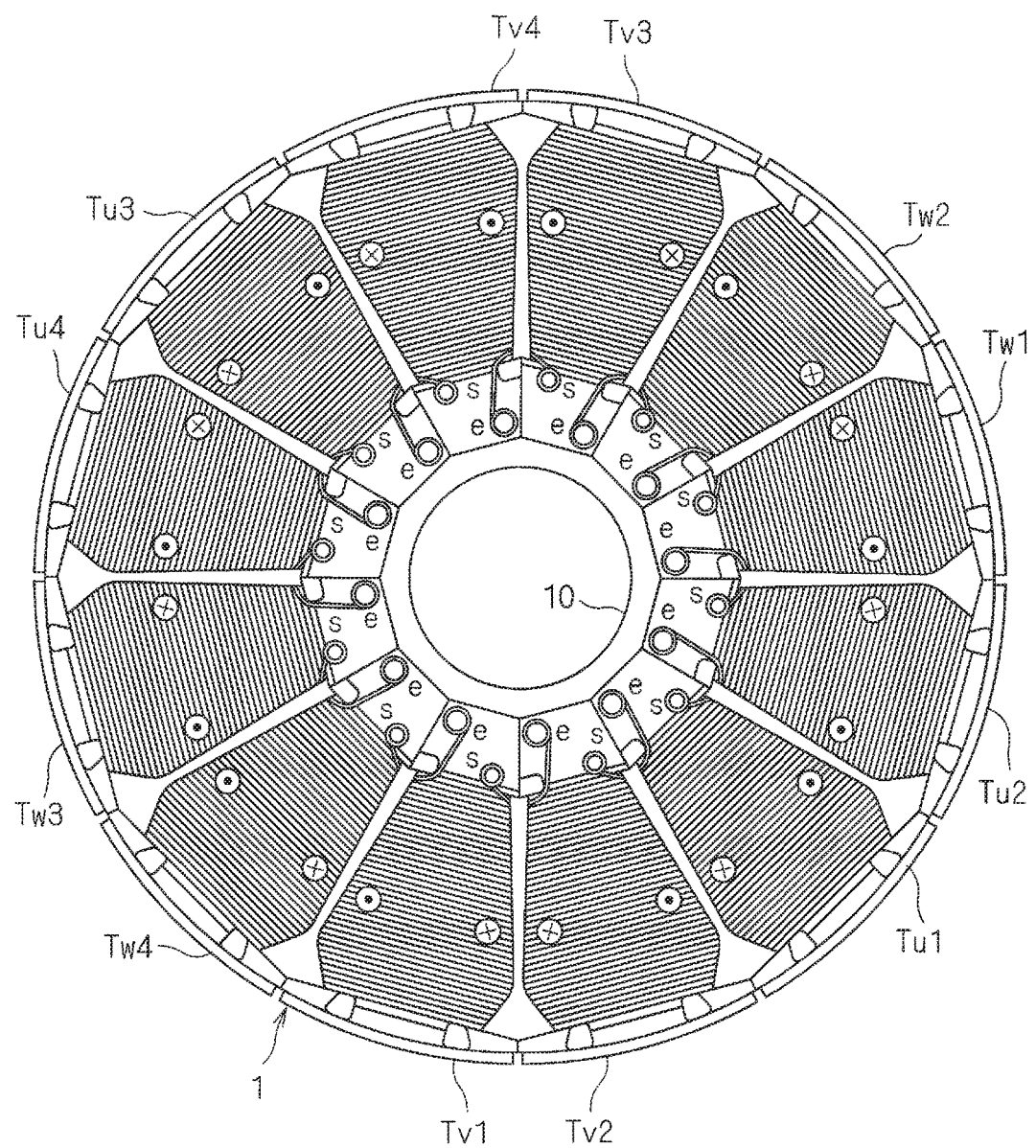
FIG. 1 is a plan view illustrating the structure of an armature according to an embodiment of the present invention.

FIG. 1 is a plan view illustrating the structure of an armature 1 according to an embodiment of the present invention. The armature 1 further includes a printed circuit board 3 to be described later.

Figure 2:
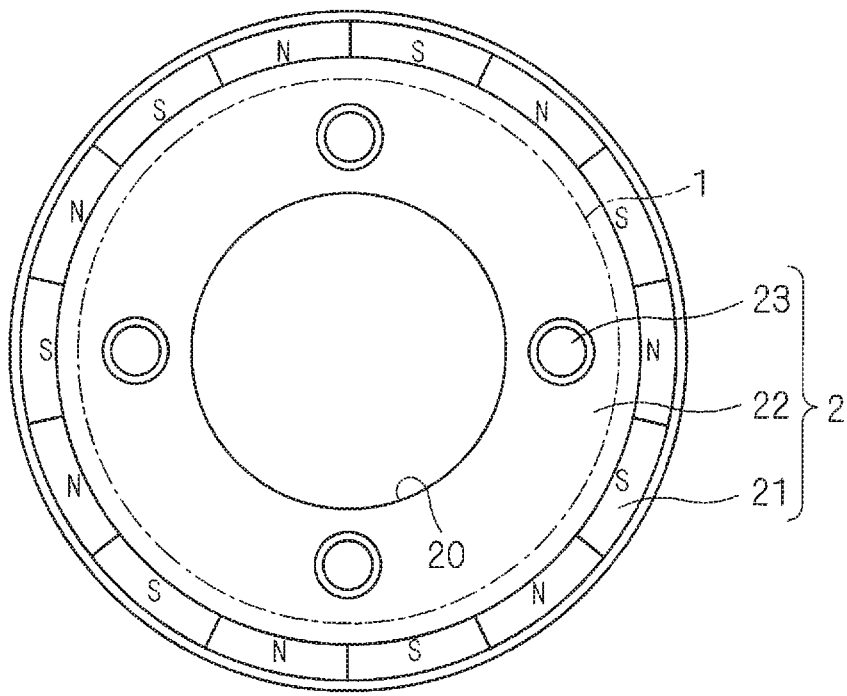
FIGS. 2 and 3 are plan views illustrating the structure of a field element composing a rotating electric machine with the armature.
Figure 3:
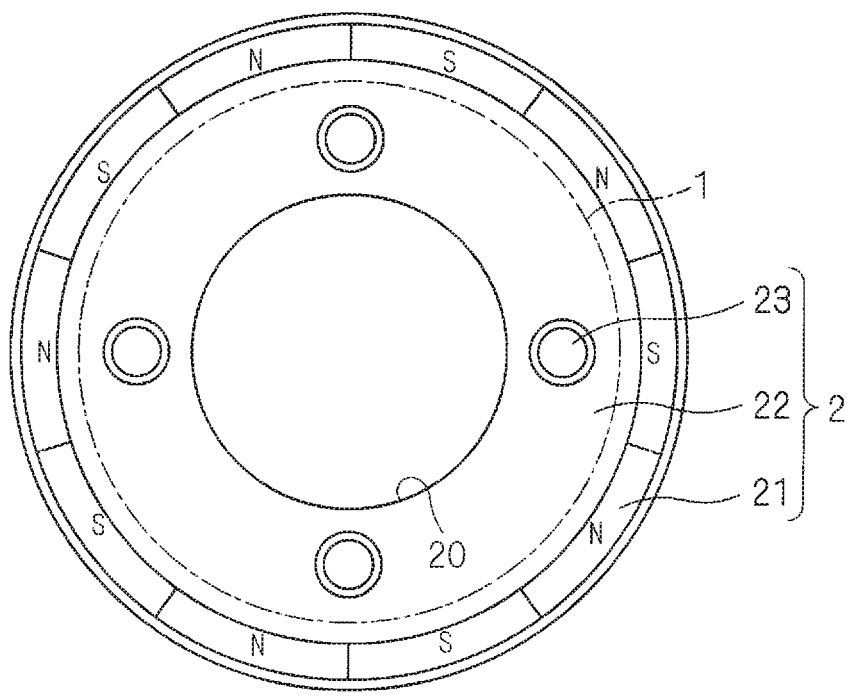

FIGS. 2 and 3 are plan views each illustrating the structure of a field element 2 composing a rotating electric machine with the armature 1. The rotating electric machine is of a so-called outer rotor type, and the field element 2 is a rotor including magnets 21 surrounding the armature 1 (indicated by an imaginary chain line).

FIG. 2 illustrates a case where the field element 2 has 14 (=12+2) poles, whereas FIG. 3 illustrates a case where the field element 2 has 10 (=12−2) poles. Specifically, fourteen magnets 21 are arranged in a circumferential direction in FIG. 2, and ten magnets 21 are arranged in a circumferential direction in FIG. 3. In either case, the magnets 21 adjacent in the circumferential direction have different polarities (N/S) with respect to the armature 1.

The magnets 21 are desirably resin magnets. This is because there is no need to prepare the magnets 21 separately to obtain the necessary number of poles for the field element 2 and the magnets 21 can easily be obtained only by differing in the magnetizing process.

The resin magnets are obtained by dispersedly mixing, in a resin binder, a ferrite magnetic powder or a rare-earth magnetic powder, such as an NdFeB powder, for example.

The field element 2 has mounting holes 23 and a mounting surface 22 in which a shaft hole 20 is opened. An object to be driven by the above-mentioned rotating electric machine (for example, a cross-flow fan for blowing) is fixed to the mounting surface 22 by a fastener (not illustrated) using the mounting holes 23. Accordingly, rotation of the field element 2 brings about rotation of the object. A shaft (not illustrated) fixed to the object passes through the shaft hole 20, and is supported to be rotatable against the armature 1.

Referring back to FIG. 1, the structure of the armature 1 will be described. The armature 1 has a through-hole 10 which is opened at the center and through which the above-mentioned shaft passes. Of course, the armature 1 does not necessarily require the through-hole 10 to be opened.

Around a predetermined location, specifically, the center (the through-hole 10 herein), of the armature 1, 12 teeth are arranged in the circumferential direction. More specifically, teeth Tu1, Tu2, Tw1, Tw2, Tv3, Tv4, Tu3, Tu4, Tw3, Tw4, Tv1, and Tv2 are arranged annularly in a counterclockwise direction in FIG. 1 in this order.

Armature windings are concentratedly wound around the respective teeth, and wires composing the armature windings are schematically illustrated in FIG. 1. The armature windings wound around the respective teeth are hereinafter referred to as winding portions.

In FIG. 1, white circles enclosing black dots (hereinafter provisionally referred to as "dotted circles") and white circles enclosing X (hereinafter provisionally referred to as "X circles") each schematically illustrate a current that flows through the winding portion. The dotted circles indicate the flow from the back to the front of the page of FIG. 1, whereas the X circles indicate the flow from the front to the back of the page of FIG. 1.

Specifically, the winding portions wound around the teeth Tu1, Tu2, Tu3, and Tu4 correspond to a U phase, and constitute a U-phase winding. Currents flow through the winding portions wound around the adjacent teeth Tu1 and Tu2 in opposite directions as viewed from the center of the armature 1. Similarly, currents flow through the winding portions wound around the adjacent teeth Tu3 and Tu4 in opposite directions as viewed from the center of the armature 1. Currents flow through the winding portions wound around the diametrically opposite teeth Tu1 and Tu3 in opposite directions as viewed from the center of the armature 1.

The winding portions wound around the teeth Tv1, Tv2, Tv3, and Tv4 correspond to a V phase, and constitute a V-phase winding. The winding portions wound around the teeth Tw1, Tw2, Tw3, and Tw4 correspond to a W phase, and constitute a W-phase winding. The winding portions wound around these teeth have similar relationships to those constituting the above-mentioned U-phase winding as to the directions in which the currents flow.

The currents that flow through any two of the U-phase winding, the V-phase winding, and the W-phase winding (these windings constitute a three-phase winding) have the same polarity, and the current that flows through the other one of the U-phase winding, the V-phase winding, and the W-phase winding has a different polarity. Described here is a case where the currents that flow through the V-phase winding and the W-phase winding have the same polarity, and the current that flows through the U-phase winding has a different polarity.

Figure 4:
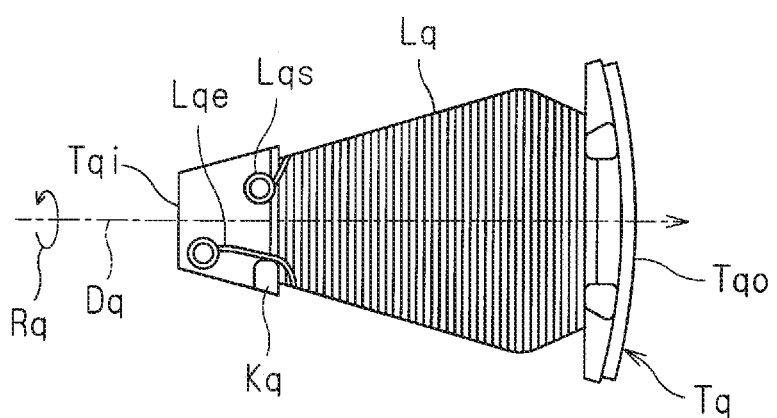
FIG. 4 is a plan view illustrating the structure of a tooth.

FIG. 4 is a plan view illustrating the structure of a tooth Tq. The tooth Tq herein represents the teeth Tu1, Tu2, Tu3, Tu4, Tv1, Tv2, Tv3, Tv4, Tw1, Tw2, Tw3, and Tw4.

The tooth Tq has a first end portion Tqi that is farther from the field element 2 (here, closer to the through-hole 10 in FIG. 1), and a second end portion Tqo that is closer to the field element 2.

The tooth Tq is covered with an insulator, and a winding portion Lq is wound around the tooth Tq through the insulator.

The winding portion Lq has a first winding end Lqs and a second winding end Lqe as its ends. Both the first winding end Lqs and the second winding end Lqe appear at the first end portion Tqi of the tooth Tq. More specifically, the insulator of the tooth Tq has a pair of pins at the first end portion Tqi. The first winding end Lqs and the second winding end Lqe are connected to these pins.

The winding portion Lq is wound from the first winding end Lqs to the second winding end Lqe in a counterclockwise direction Rq as viewed from a direction Dq in which the second end portion Tqo of the tooth Tq is viewed from the first end portion Tqi of the tooth Tq. As described above, the winding portions are wound around the respective teeth Tu1, Tu2, Tu3, Tu4, Tv1, Tv2, Tv3, Tv4, Tw1, Tw2, Tw3, and Tw4 in the same direction (herein, counterclockwise direction) as viewed from the center of the armature 1.

The pin to which the second winding end Lqe is connected is often located father from the field element 2 (herein, closer to the through-hole 10 in FIG. 1) than the pin to which the first winding end Lqs is connected for convenience of winding of the winding portion Lq.

A protrusion Kq that protrudes in one direction (a direction perpendicular to and coming out of the page of FIG. 4) of directions in which the shaft extends is provided at a portion of the insulator of the tooth Tq that is closer to the first end portion Tqi. The protrusion Kq performs a function of preventing looseness at the end of winding of the winding portion Lq.

Figure 5:
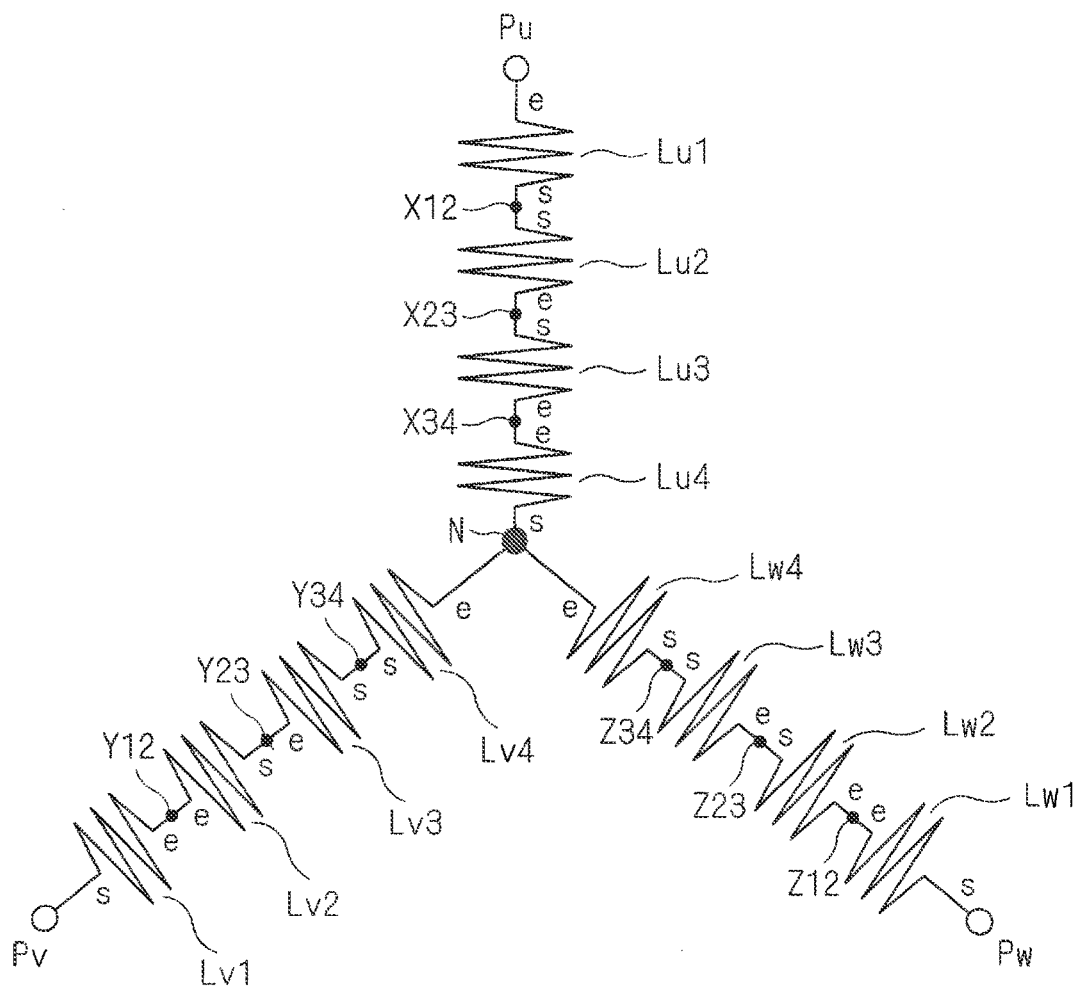
FIG. 5 is a connection diagram illustrating a connection state of armature windings.

FIG. 5 is a connection diagram illustrating a connection state of the winding portions. Winding portions Lu1, Lu2, Lu3, Lu4, Lv1, Lv2, Lv3, Lv4, Lw1, Lw2, Lw3, and Lw4 shown in FIG. 5 are respectively wound around the teeth Tu1, Tu2, Tu3, Tu4, Tv1, Tv2, Tv3, Tv4, Tw1, Tw2, Tw3, and Tw4.

In FIG. 5, a location corresponding to the first winding end (shown as the first winding end Lqs in FIG. 4) of each winding portion bears a symbol "s". A location corresponding to the second winding end (shown as the second winding end Lqe in FIG. 4) of each winding portion bears a symbol "e". The winding portions are connected in the following manner: the second winding end e of the winding portion Lu1 and a U-phase input end Pu are connected to each other; the first winding end s of the winding portion Lu1 and the first winding end s of the winding portion Lu2 are connected to each other at a connection point X12; the second winding end e of the winding portion Lu2 and the first winding end s of the winding portion Lu3 are connected to each other at a connection point X23; the first winding end s of the winding portion Lu4 and a neutral point N are connected to each other; the second winding end e of the winding portion Lu4 and the second winding end e of the winding portion Lu3 are connected to each other at a connection point X34; the first winding end s of the winding portion Lv3 and the first winding end s of the winding portion Lv4 are connected to each other at a connection point Y34; the second winding end e of the winding portion Lv4 and the neutral point N are connected to each other; the second winding end e of the winding portion Lv3 and the first winding end s of the winding portion Lv2 are connected to each other at a connection point Y23; the first winding end s of the winding portion Lv1 and a V-phase input end Pv are connected to each other; the second winding end e of the winding portion Lv1 and the second winding end e of the winding portion Lv2 are connected to each other at a connection point Y12; the first winding end s of the winding portion Lw3 and the first winding end s of the winding portion Lw4 are connected to each other at a connection point Z34; the second winding end e of the winding portion Lw4 and the neutral point N are connected to each other; the second winding end e of the winding portion Lw3 and the first winding end s of the winding portion Lw2 are connected to each other at a connection point Z23; the first winding end s of the winding portion Lw1 and a W-phase input end Pw are connected to each other; and the second winding end e of the winding portion Lw1 and the second winding end e of the winding portion Lw2 are connected to each other at a connection point Z12.

The U-phase winding, the V-phase winding, and the W-phase winding are star-connected to the neutral point N by such connections. The winding portions Lu1 to Lu4 are connected in series between the neutral point N and the U-phase input end Pu, and constitute the U-phase winding. The winding portions Lv1 to Lv4 are connected in series between the neutral point N and the V-phase input end Pv, and constitute the V-phase winding. The winding portions Lw1 to Lw4 are connected in series between the neutral point N and the W-phase input end Pw, and constitute the W-phase winding.

Currents flow through the winding portions Lu1 and Lu3 in opposite directions, and flow through the winding portions Lu2 and Lu4 in opposite directions. Currents flow through the winding portions Lv1 and Lv3 in opposite directions, and flow through the winding portions Lv2 and Lv4 in opposite directions. Currents flow through the winding portions Lw1 and Lw3 in opposite directions, and flow through the winding portions Lw2 and Lw4 in opposite directions.

All the directions of the currents indicated by the dotted circles and the X circles in FIG. 1 can thus be achieved by applying a U-phase voltage, a V-phase voltage, and a W-phase voltage to the U-phase input end Pu, the V-phase input end Pv, and the W-phase input end Pw, respectively.

Figure 6:
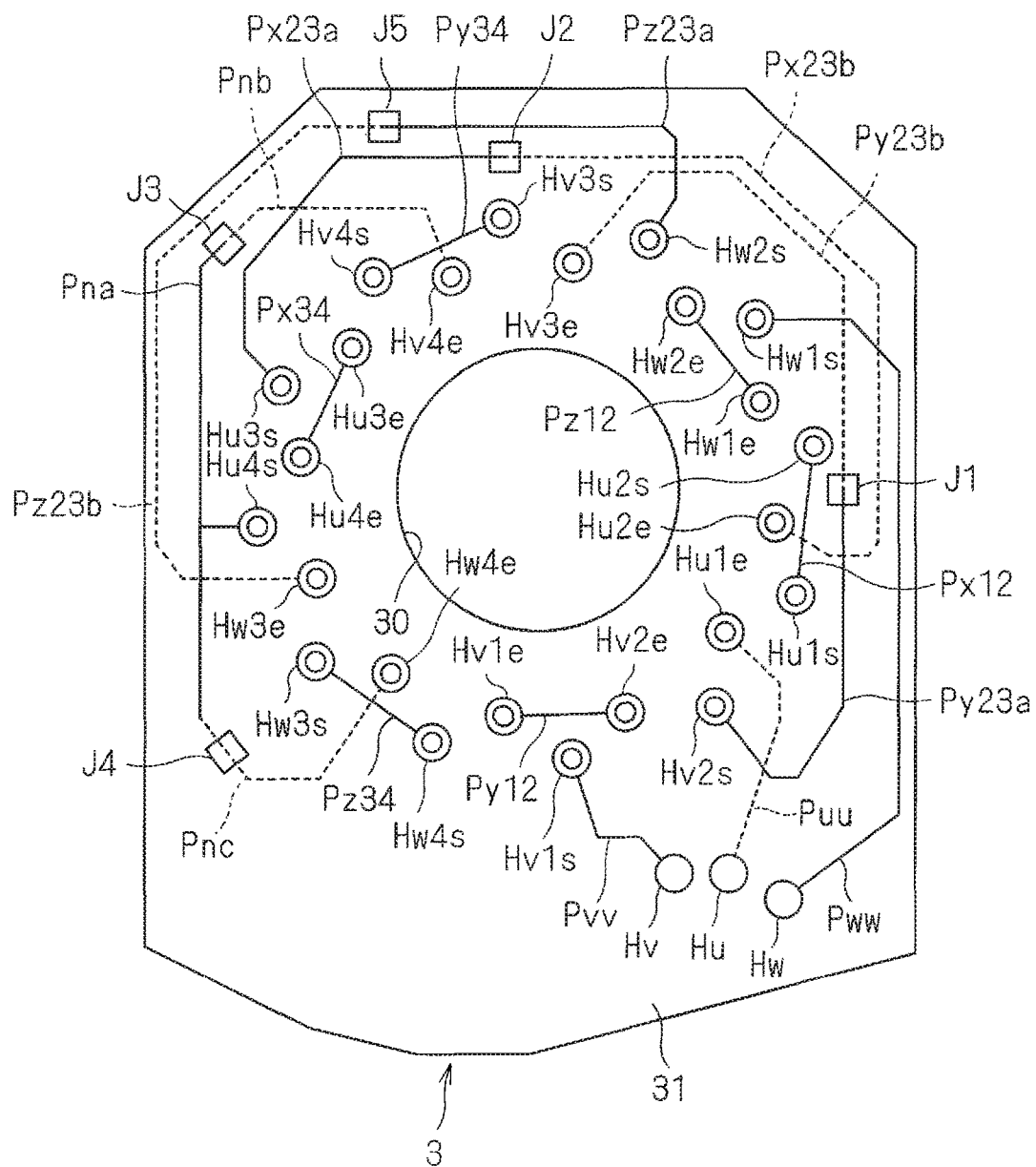
FIG. 6 is a wiring diagram illustrating the structure of a printed circuit board.

FIG. 6 is a wiring diagram illustrating the structure of the printed circuit board 3. The printed circuit board 3 achieves the connection state of the armature windings illustrated in FIG. 5. Specifically, the printed circuit board 3 is provided with a first land group, a second land group surrounded by the first land group, and lands Hu, Hv, and Hw.

In the first land group, a plurality of lands to which the first winding ends of the winding portions are connected are arranged annularly. In the second land group, a plurality of lands to which the second winding ends of the winding portions are connected are arranged annularly. These lands have, for example, open holes through which the above-mentioned pins pass. A through-hole 30 almost matching the through-hole 10 so that the above-mentioned shaft passes through the through-hole 30 is opened in the printed circuit board 3 so as to be surrounded by the second land group.

The first land group includes lands Hu1s, Hv1s, Hw1s, Hu2s, Hv2s, Hw2s, Hu3s, Hv3s, Hw3s, Hu4s, Hv4s, and Hw4s to which the pins to which the first winding ends of the winding portions Lu1, Lv1, Lw1, Lu2, Lv2, Lw2, Lu3, Lv3, Lw3, Lu4, Lv4, and Lw4 are connected are connected.

The second land group includes lands Hu1e, Hv1e, Hw1e, Hu2e, Hv2e, Hw2e, Hu3e, Hv3e, Hw3e, Hu4e, Hv4e, and Hw4e to which the pins to which the second winding ends of the winding portions Lu1, Lv1 Lw1, Lu2, Lv2, Lw2, Lu3, Lv3, Lw3, Lu4, Lv4, and Lw4 are connected are connected.

When the size of the diameter of a ring formed by each of the first land group and the second land group is ignored, the lands in the first land group and the second land group are arranged circumferentially in the counterclockwise direction in the following order: the lands Hv1e, Hv1s, Hv2e, Hv2s, Hu1e, Hu1s, Hu2e, Hu2s, Hw1e, Hw1s, Hw2e, Hw2s, Hv3e, Hv3s, Hv4e, Hv4s, Hu3e, Hu3s, Hu4e, Hu4s, Hw3e, Hw3s, Hw4e, and Hw4s.

The printed circuit board 3 is further provided with a first-layer wiring pattern indicated by solid lines and a second-layer wiring pattern indicated by dashed lines, and the first-layer wiring pattern and the second-layer wiring pattern are located in different wiring layers with an insulating layer 31 therebetween. The first-layer wiring pattern and the second-layer wiring pattern suffice as wiring layers necessary for the printed circuit board 3. The insulating layer 31 is provided with connection portions J1 to J5 for connecting parts of first-layer wiring pattern and parts of second-layer wiring pattern.

The first wiring layer pattern includes wiring Py23a connecting the land Hv2s and the connection portion J1, wiring Pww connecting the lands Hw and Hw1s, wiring Px12 connecting the lands Hu1s and Hu2s, wiring Pz23a connecting the land Hw2s and the connection portion J5, wiring Px23a connecting the land Hu3s and the connection portion J2, wiring Pna connecting the connection portions J3 and J4 to the land Hu4s, and wiring Pz34 connecting the lands Hw3s and Hw4s.

The second wiring layer pattern includes wiring Puu connecting the lands Hu and Hu1e, wiring Px23b connecting the land Hu2e and the connection portion J2, wiring Py23b connecting the land Hv3e and the connection portion J1, wiring Pnb connecting the land Hv4e and the connection portion J3, wiring Pz23b connecting the land Hw3e and the connection portion J5, and wiring Pnc connecting the land Hw4e and the connection portion J4.

The first wiring layer pattern or the second wiring layer pattern includes wiring Py12 connecting the lands Hv1e and Hv2e, wiring Pvv connecting the lands Hu and Hv1s, wiring Pz12 connecting the lands Hw1e and Hw2e, and wiring Px34 connecting the lands Hu3e and Hu4e. FIG. 6 illustrates a case where the above-mentioned wiring is included in the first wiring pattern.

By using such a wiring pattern, the connection relationship shown in FIG. 5 can be obtained in a two-layer wiring pattern. The printed circuit board achieving the wiring layers thus has a simple structure, and is easy to manufacture.

Figure 7:
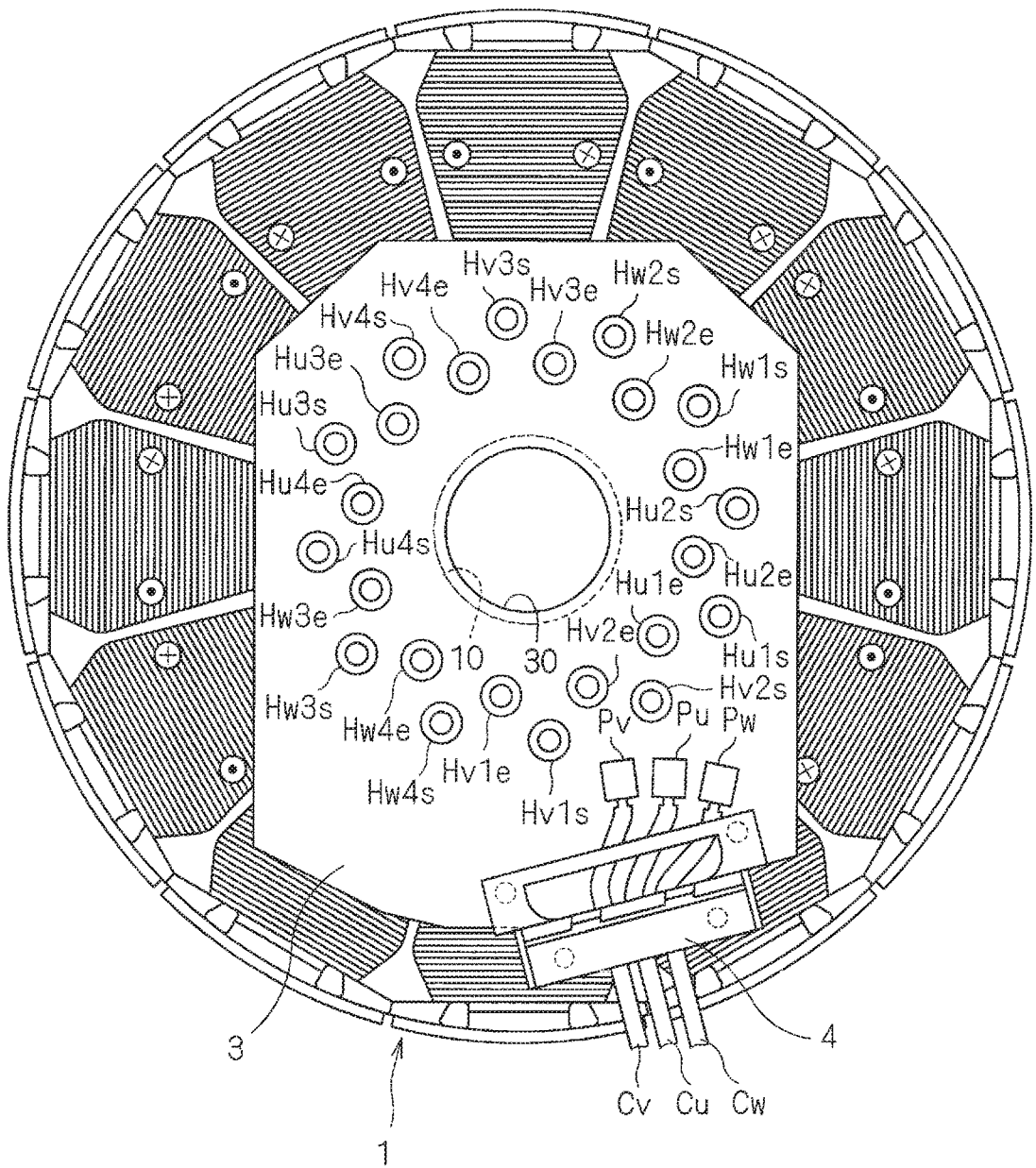
FIG. 7 is a plan view illustrating the structure of the armature.

FIG. 7 is a plan view illustrating the structure of the armature 1, and illustrates a state in which the printed circuit board 3 is placed from the front of the page of FIG. 7 onto the structure illustrated in FIG. 1. FIG. 7 illustrates a state in which each of the lands has an open hole and a pin to which the first winding end or the second winding end is connected enters the open hole (a circle inside the circle representing each of the lands schematically indicates the pin). Although FIG. 7 illustrates a case where the through-hole 30 is smaller than the through-hole 10, the through-hole 30 may be larger than the through-hole 10.

The printed circuit board 3 is equipped with a connector 4. Cables Cu, Cv, and Cw respectively supply the U-phase voltage, the V-phase voltage, and the W-phase voltage, and are respectively connected to the lands Hu, Hv, and Hw (see FIG. 6) through the U-phase input end Pu, the V-phase input end Pv, and the W-phase input end Pw.

By using the printed circuit board 3 as described above, the armature 1 generates a 12-pole rotating electric field with application of a three-phase voltage to the second winding end of a tooth pair Tua, the first winding end of a tooth pair Tva, and the first winding end of a tooth pair Twa.

A rotating electric machine that employs the printed circuit board 3 is desirably of an outer rotor type, considering that the printed circuit board 3 can be miniaturized. This is because an outside diameter of the armature 1 is smaller than that of the rotor, and a diameter of an approximate circle obtained by connecting the first end portions of the teeth is smaller than the outside diameter of the armature 1 by the length of the tooth. This is also because the lands Hu1s, Hv1s, Hw1s, Hu2s, Hv2s, Hw2s, Hu3s, Hv3s, Hw3s, Hu4s, Hv4s, Hw4s, Hu1e, Hv1e, Hw1e, Hu2e, Hv2e, Hw2e, Hu3e, Hv3e, Hw3e, Hu4e, Hv4e, and Hw4e are located closer to an inner circumference of the rotating electric machine.

The rotating electric machine of the outer rotor type is suitable, for example, to drive cross-flow fans to be employed in indoor units of air conditioners.

Figure 8:
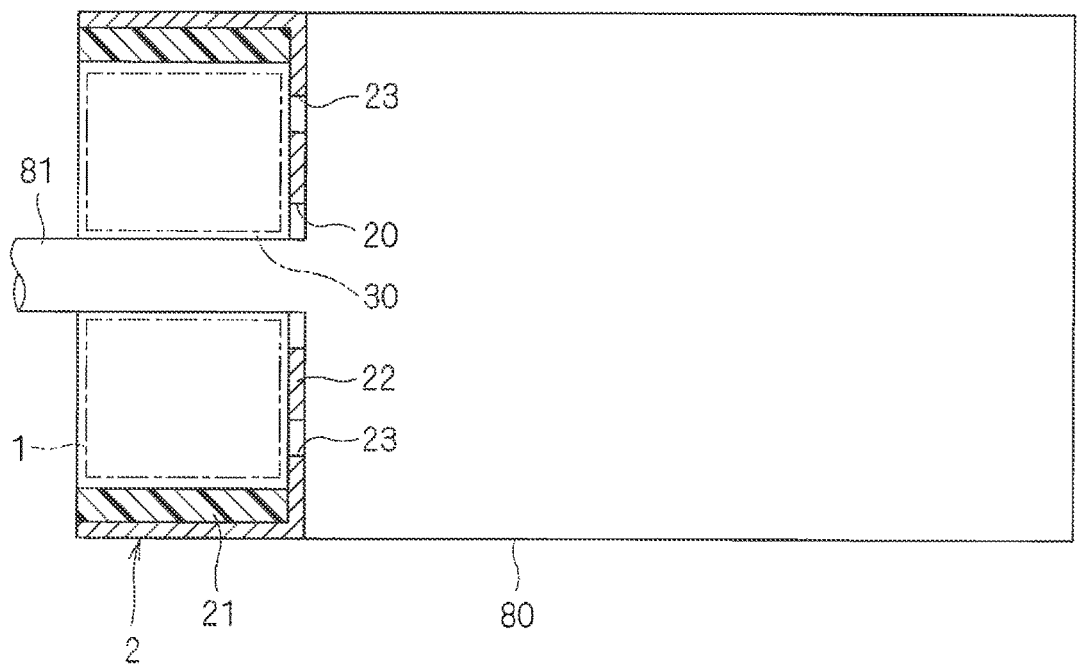
FIG. 8 is a cross-sectional view illustrating the structure of a cross-flow fan.

FIG. 8 is a cross-sectional view illustrating the structure of a cross-flow fan 80 and a rotating electric machine for driving the cross-flow fan 80. Hatching of a cross section of the cross-flow fan 80 is omitted to avoid complication of the drawing. The armature 1 is simply indicated by alternate long and short dashed lines.

The cross-flow fan 80 is fixed to the mounting surface 22 of the field element 2 by the fastener (not illustrated) using the mounting holes 23. Accordingly, rotation of the field element 2 brings about rotation of the cross-flow fan 80. That is to say, the rotating electric machine including the field element 2 drives the cross-flow fan 80.

A shaft 81 of the cross-flow fan 80 passes through the shaft hole 20 and the through-hole 30 (and the through-hole 10 in actuality), and is supported by a supporting mechanism that is not illustrated, to be rotatable against the armature 1.

Since the structures of the supporting mechanism, the fastener, and the cross-flow fan 80 can be achieved using known techniques, the detailed description thereof is omitted herein.

The rotating electric machine of the outer rotor type that drives the cross-flow fan 80 has a larger diameter of the rotor. Thus, the area of the magnets 21 can be designed to be larger. This is preferable because the necessary magnetic flux can be obtained even when the magnetic flux density of the magnets 21 is reduced. Furthermore, when the magnets 21 are resin magnets, the magnets 21 have the advantage that a material with a low magnetic flux density such as a ferrite magnet suffices as a magnetic powder to be dispersedly mixed in the magnets 21. This is advantageous in more contributing to inexpensive manufacturing compared with a case where a rare-earth magnet such as NdFeB is used as the magnetic powder.

The rotating electric machine of the outer rotor type is easily multipolarized. The length of a circular arc per pole can be increased due to its larger outer diameter, and, when the absolute values of dimensional tolerances in the mass production are the same (e.g., ±0.1 mm), errors in polar angle can be set with higher precision to enable the mass production in the rotating electric machine of the outer rotor type than errors in polar angle of magnets with a small diameter used in the rotating electric machine of an inner rotor type. This is advantageous in reducing vibration and noise.

When the types of the magnets, such as ferrite magnets and rare-earth magnets, are the same, the resin magnets contribute to inexpensive manufacturing more than sintered magnets due to reduction in number of magnet-fixing parts and in number of shaping processes (C-plane polishing, grinding for sizing, and the like for the sintered magnets can be omitted).

Furthermore, use of the resin magnets as the magnets allows the field elements having different number of poles to be easily obtained. This is because only a mold and a magnetizing yoke for the resin magnets having a different number of poles have to be newly provided, while using an armature that is the same as a conventional armature. Particularly, when a rotor is composed only of the resin magnets, parts for fixing the magnets do not have to be newly provided for each of the resin magnets having different number of poles, and parts that are the same as conventional parts can be used.

Figure 9:
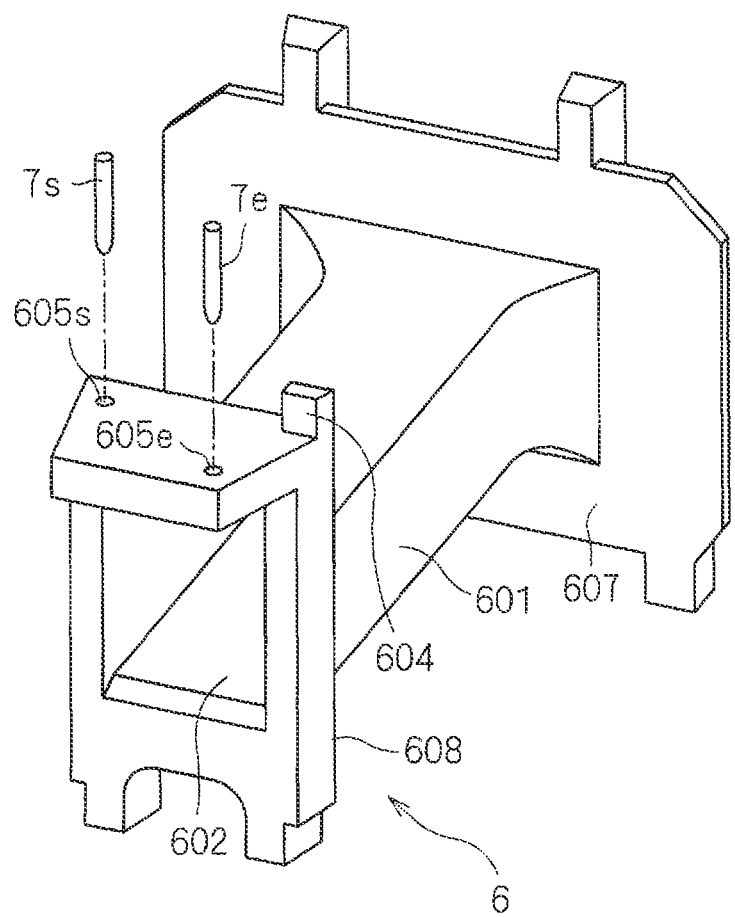
FIG. 9 is a perspective view illustrating the shape of an insulator.
Figure 10:
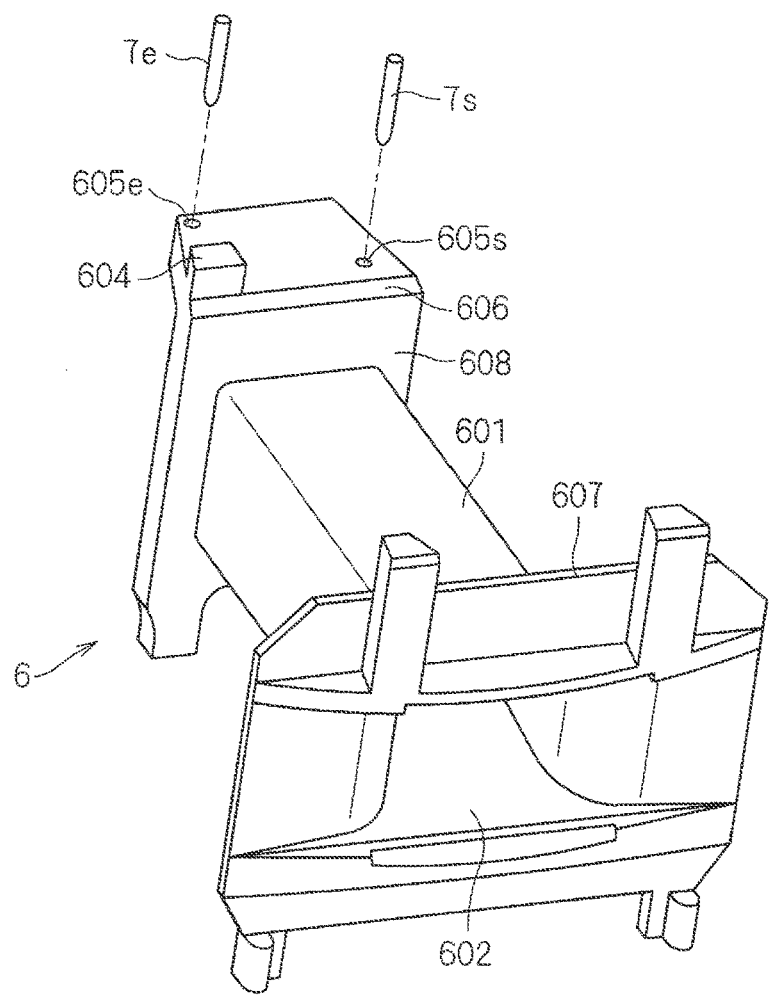
FIG. 10 is a perspective view illustrating the shape of the insulator.

FIGS. 9 and 10 are perspective views each illustrating the shape of an insulator 6. The insulator 6 covers each of the teeth, and an armature winding is wound therearound.

The insulator 6 includes a first plate 608 located at the first end portion Tqi of the tooth Tq, a second plate 607 located at the second end portion Tqo of the tooth Tq, and a bobbin 601 around which an armature winding is wound between the first plate 608 and the second plate 607, also with reference to FIG. 4. The bobbin 601 has an inner circumferential surface 602 at its inner side.

The first plate 608 has open holes 605s and 605e. Pins 7s and 7e are respectively inserted into the open holes 605s and 605e. The first winding end Lqs and the second winding end Lqe of the winding portion Lq are respectively connected to the pins 7s and 7e.

The first plate 608 is provided with a protrusion 604 that protrudes toward the same side as a side where the pins 7s and 7e are provided. The protrusion 604 functions as the protrusion Kq of FIG. 4.

The first plate 608 has an oblique surface 606 at a portion closer to the field element 2 on the side where the pins 7s and 7e and the protrusion 604 are provided. This prevents the first plate 608 from locally exerting a strong force on the armature winding that is directed from the winding portion Lq to the pins 7s and 7e, with reference to FIG. 4.

Figure 11:
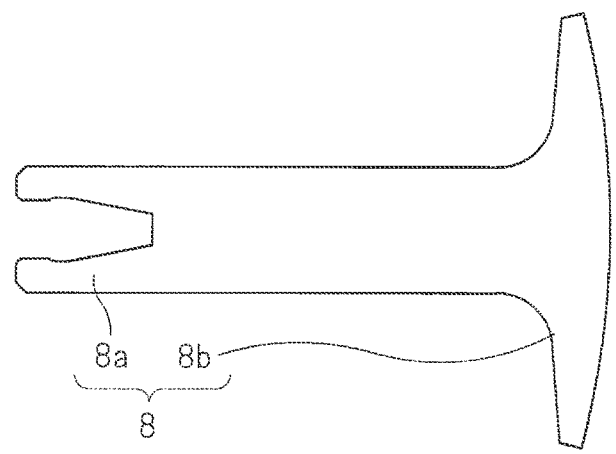
FIG. 11 is a plan view illustrating the shape of a teeth core.

FIG. 11 is a plan view illustrating the shape of a tooth core 8 with which each of the teeth is configured. The tooth core 8 is achieved, for example, with electromagnetic steel sheets laminated in a direction perpendicular to the page of FIG. 11. The tooth core 8 includes a connecting part 8a and a magnetic pole part 8b.

The tooth core 8 is inserted into the bobbin 601 so that the connecting part 8a is placed closer to the first plate 608 and the magnetic pole part 8b is placed closer to the second plate 607. The inner circumferential surface 602 thereby covers the tooth core 8.

Figure 12:
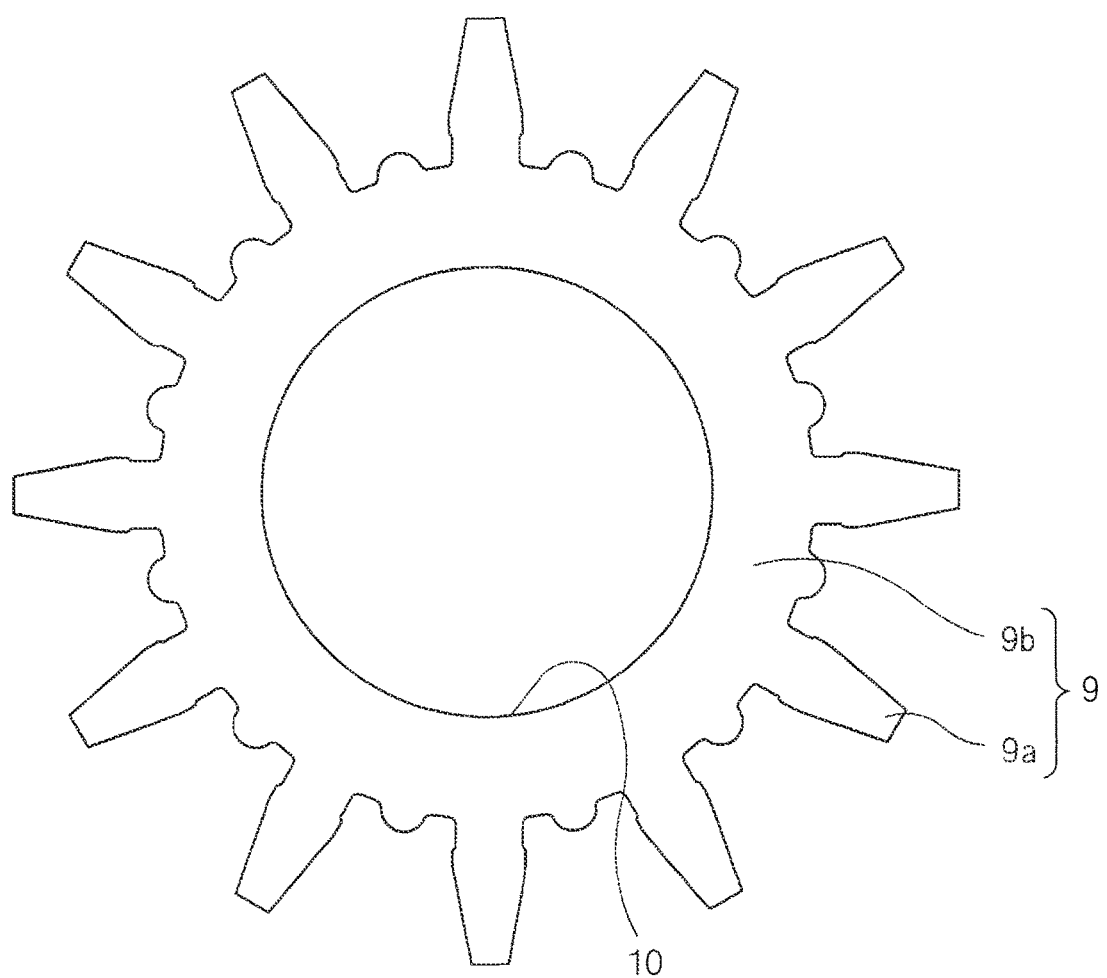
FIG. 12 is a plan view illustrating the shape of a yoke core.

FIG. 12 is a plan view illustrating the shape of a yoke core 9. The yoke core 9 is achieved, for example, with electromagnetic steel sheets laminated in a direction perpendicular to the page of FIG. 12. The yoke core 9 includes a plurality of connecting parts 9a and a coupling part 9b.

The connecting parts 9a are annularly arranged, and are coupled by the coupling part 9b. The connecting parts 8a and 9a are combined with each other to be coupled together. By coupling tooth cores 8 to the connecting parts 9a that are adjacent in the circumferential direction, the structure illustrated in FIG. 1 can be obtained. For example, the throughhole 10 of the armature 1 is opened at the coupling part 9b.

All the description above is illustrative, and it is obvious that appropriate modifications can be made within a scope of not interfering with the effect.

While the invention has been described in detail, the foregoing description is in all aspects illustrative and not restrictive. It is therefore understood that numerous modifications not having been described can be devised without departing from the scope of the invention.

The invention claimed is:

1. An armature configured to be part of an outer rotor electric machine with a field element having (12±2)n poles, n being a positive integer, the armature comprising 12n teeth arranged in a circumferential direction around a predetermined location and as a three-phase winding, a first-phase winding, a second-phase winding, and a third-phase winding star-connected to a neutral point, wherein
    said first-phase winding includes first to fourth first-phase winding portions connected in series between said neutral point and a first-phase input end,
    said second-phase winding includes first to fourth second-phase winding portions connected in series between said neutral point and a second-phase input end,
    said third-phase winding includes first to fourth third-phase winding portions connected in series between said neutral point and a third-phase input end,
    said first to fourth first-phase winding portions, said first to fourth second-phase winding portions, and said first to fourth third-phase winding portions are arranged annularly around a predetermined location,
    each of said first to fourth first-phase winding portions, said first to fourth second-phase winding portions, and said first to fourth third-phase winding portions has a first winding end and a second winding end as ends thereof, and
    directions in which said first to fourth first-phase winding portions, said first to fourth second-phase winding portions, and said first to fourth third-phase winding portions are each wound from said first winding end to said second winding end are the same as viewed from said predetermined location.

2. An armature comprising, as a three-phase winding, a first-phase winding, a second-phase winding, and a third-phase winding star-connected to a neutral point, wherein
    said first-phase winding includes first to fourth first-phase winding portions connected in series between said neutral point and a first-phase input end,
    said second-phase winding includes first to fourth second-phase winding portions connected in series between said neutral point and a second-phase input end,
    said third-phase winding includes first to fourth third-phase winding portions connected in series between said neutral point and a third-phase input end,
    said first to fourth first-phase winding portions, said first to fourth second-phase winding portions, and said first to fourth third-phase winding portions are arranged annularly around a predetermined location,
    each of said first to fourth first-phase winding portions, said first to fourth second-phase winding portions, and said first to fourth third-phase winding portions has a first winding end and a second winding end as ends thereof,
    directions in which said first to fourth first-phase winding portions, said first to fourth second-phase winding portions, and said first to fourth third-phase winding portions are each wound from said first winding end to said second winding end are the same as viewed from said predetermined location,
    said first winding end of said first first-phase winding portion and said first winding end of said second first-phase winding portion are connected to each other, said second winding end of said first first-phase winding portion and said first-phase input end are connected to each other, said second winding end of said second first-phase winding portion and said first winding end of said third first-phase winding portion are connected to each other, said first winding end of said fourth first-phase winding portion and said neutral point are connected to each other, said second winding end of said fourth first-phase winding portion and said second winding end of said third first-phase winding portion are connected to each other, said first winding end of said third second-phase winding portion and said first winding end of said fourth second-phase winding portion are connected to each other, said second winding end of said fourth second-phase winding portion and said neutral point are connected to each other, said second winding end of said third second-phase winding portion and said first winding end of said second second-phase winding portion are connected to each other, said first winding end of said first second-phase winding portion and said second-phase input end are connected to each other, said second winding end of said first second-phase winding portion and said second winding end of said second second-phase winding portion are connected to each other, said first winding end of said third third-phase winding portion and said first winding end of said fourth third-phase winding portion are connected to each other, said second winding end of said fourth third-phase winding portion and said neutral point are connected to each other, said second winding end of said third third-phase winding portion and said first inding end of said second third-phase winding portion are connected to each other, said first winding end of said first third-phase winding portion and said third-phase input end are connected to each other, and said second winding end of said first third-phase winding portion and said second winding end of said second third-phase winding portion are connected to each other.

3. The armature according to claim 2, wherein said first second-phase winding portion, said second second-phase winding portion, said first first-phase winding portion, said second first-phase winding portion, said first third-phase winding portion, said second third-phase winding portion, said third second-phase winding portion, said fourth second-phase winding portion, said third first-phase winding portion, said fourth first-phase winding portion, said third third-phase winding portion, and said fourth third-phase winding portion are arranged annularly around said predetermined location in this order.

4. The armature according to claim 3, wherein said second winding end of said first second-phase winding portion, said first winding end of said first second-phase winding portion, said second winding end of said second second-phase winding portion, said first winding end of said second second-phase winding portion, said second winding end of said first first-phase winding portion, said first winding end of said first first-phase winding portion, said second winding end of said second first-phase winding portion, said first winding end of said second first-phase winding portion, said second winding end of said first third-phase winding portion, said first winding end of said first third-phase winding portion, said second winding end of said second third-phase winding portion, said first winding end of said second third-phase winding portion, said second winding end of said third second-phase winding portion, said first winding end of said third second-phase winding portion, said second winding end of said fourth second-phase winding portion, said first winding end of said fourth second-phase winding portion, said second winding end of said third first-phase winding portion, said first winding end of said third first-phase winding portion, said second winding end of said fourth first-phase winding portion, said first winding end of said fourth first-phase winding portion, said second winding end of said third third-phase winding portion, said first winding end of said third third-phase winding portion, said second winding end of said fourth third-phase winding portion, and said first winding end of said fourth third-phase winding portion are arranged annularly around said predetermined location in this order.

5. A rotating electric comprising:
the armature according to claim 4; and
a field element having $(12\pm2)n$ poles, n being a positive integer.

6. The rotating electric machine according to claim 5, wherein said field element includes magnets surrounding said armature, so that said rotating electric machine is of an outer rotor type.

7. The rotating electric machine according to claim 6, wherein said magnets are resin magnets.

8. A cross-flow fan to be driven by the rotating electric machine according to claim 6.

9. A cross-flow fan to be driven by the rotating electric machine according to claim 7.

* * * * *